US 7,796,714 B2

(12) United States Patent
Rabbath et al.

(10) Patent No.: US 7,796,714 B2
(45) Date of Patent: Sep. 14, 2010

(54) MULTIPLE SIGNAL RECEIVING

(75) Inventors: Rita R. Rabbath, Huntington Beach, CA (US); Terry E. Flach, Altadena, CA (US); James S. Tsusaki, Huntington Beach, CA (US); Timothy J. Hughes, San Diego, CA (US); Kurt I. Winckler, Fullerton, CA (US)

(73) Assignee: Powerwave Cognition, Inc., Santa Ana, CA (US)

( * ) Notice: Subject to any disclaimer, the term of this patent is extended or adjusted under 35 U.S.C. 154(b) by 960 days.

(21) Appl. No.: 11/461,862

(22) Filed: Aug. 2, 2006

(65) Prior Publication Data

US 2008/0031388 A1    Feb. 7, 2008

(51) Int. Cl.
*H04L 27/08*   (2006.01)
*H03D 1/04*    (2006.01)
*H03D 1/06*    (2006.01)
*H03K 5/01*    (2006.01)
*H03K 6/04*    (2006.01)

(52) U.S. Cl. .................. 375/345; 375/316; 375/344; 375/346; 375/349

(58) Field of Classification Search .............. 375/316, 375/344–346, 349
See application file for complete search history.

(56) References Cited

U.S. PATENT DOCUMENTS

| 6,114,986 | A  | * | 9/2000  | Cassen et al. ............... 342/175 |
| 7,653,158 | B2 | * | 1/2010  | Rawlins et al. ............. 375/345 |
| 2002/0167374 | A1 | * | 11/2002 | Hunt et al. .................. 333/186 |
| 2003/0036410 | A1 | * | 2/2003  | Judd et al. .................. 455/561 |
| 2003/0194031 | A1 | * | 10/2003 | Strolle et al. ................ 375/347 |
| 2005/0147057 | A1 | * | 7/2005  | LaDue ....................... 370/310 |
| 2005/0186928 | A1 | * | 8/2005  | Miura ..................... 455/234.1 |
| 2007/0140161 | A1 | * | 6/2007  | Silverman et al. ........... 370/329 |

OTHER PUBLICATIONS

A Software-Defined Radio for the Masses, Part 1, Gerald Youngblood, Jul./Aug. 2002.*
Malcolm Smith et al., Architecture, System, and Circuit Considerations for SDR Receiver Front-Ends, 2004.*

* cited by examiner

*Primary Examiner*—David C Payne
*Assistant Examiner*—Erin M File
(74) *Attorney, Agent, or Firm*—Strategic Patents, P.C.

(57) ABSTRACT

In one aspect, the invention is a multichannel receiver. The multichannel receiver includes a first channel circuit of N channel circuits. The first channel circuit includes a band pass (BP) filter and a gain control (GC) feedback circuit configured to adjust a signal provided by the BP filter with respect to a reference voltage.

10 Claims, 6 Drawing Sheets

MULTIPLE SIGNAL RECEIVING

TECHNICAL FIELD

The invention relates to communication systems, and in particular, communications systems having a receiver to receive and process signals.

BACKGROUND

In wireless networks, successful data transmission requires a transmitter to transmit a signal with an energy per bit that is large enough for a receiver to distinguish the signal from noise. Free space propagation causes energy of the signal to decay as inverse of the distance squared. Thus, maintaining sufficient energy per bit such that the transmission is successful as the range is increased requires that either the power of the transmission is increased or the number of bits transmitted per unit time is decreased or a combination of both.

SUMMARY

In one aspect, the invention is a multichannel receiver. The multichannel receiver includes a first channel circuit of N channel circuits. The first channel circuit includes a band pass (BP) filter and a gain control (GC) feedback circuit configured to adjust a signal provided by the BP filter with respect to a reference voltage.

In another aspect, the invention is a method to receive signals. The method includes providing a waveform received to N channel circuits, isolating a first signal in the waveform using a band pass (BP) filter in a first channel circuit of the N channel circuits, isolating a second signal in the waveform in a second channel circuit of the N channel circuits and adjusting the first signal and the second signal based on a reference voltage In a further aspect, the invention is an article. The article includes a machine-readable medium that stores executable instructions to receive signals. The instructions cause a machine to provide a waveform received to N channel circuits; isolate a first signal in the waveform using a band pass (BP) filter in a first channel circuit of the N channel circuits; isolate a second signal in the waveform in a second channel circuit of the N channel circuits; and adjust the first signal and the second signal based on a reference voltage.

In a still further aspect, the invention is an article which includes a machine-readable medium that stores executable instructions to receive signals. The instructions cause a machine to provide a waveform received to N channel circuits, isolate a first signal in the waveform using a band pass (BP) filter in a first channel circuit of the N channel circuits, isolate a second signal in the waveform in a second channel circuit of the N channel circuits and adjust the first signal and the second signal based on a reference voltage.

In another aspect, the invention is a software-defined radio (SDR) multichannel receiver configured to receive signals from multiple transmitters. The SDR multichannel receiver includes a first channel circuit of N channel circuits including a first band pass (BP) filter (RF) filter configured to isolate frequencies that are no greater than about ±0.03125% from a center frequency, a mixer connected to the BP filter, an intermediate frequency (IF) BP filter connected to the mixer and a first gain control (GC) feedback circuit connected to the IF BP filter and configured to adjust a signal provided by the BP filter with respect to a reference voltage. The GC feedback circuit includes a variable gain amplifier (VGA), a detector and a summer connected to the detector and the VGA. The SDR multichannel receiver also includes a second channel circuit of the N channel circuits including a second GC feedback circuit configured to adjust a signal provided by a second BP filter with respect to the reference voltage. The SDR multichannel circuit further includes an N-way splitter connected to the N channel circuits and a low-noise amplifier connected to the N-way splitter and an antenna.

In another aspect, the invention is a software-defined radio (SDR) base station. The SDR base station includes a multichannel receiver having N channel circuits. The receiver includes a first channel circuit of the N channel circuits including a first band pass (BP) radio frequency (RF) filter, the first BP filter comprises a BP filter isolating frequencies that are no greater than about ±0.03125% from a center frequency; and a first gain control (GC) feedback circuit configured to adjust a signal provided by the first BP filter with respect to a reference voltage. The receiver also includes a second channel circuit of the N channel circuits including a second GC feedback circuit configured to adjust a signal provided by a second BP filter with respect to the reference voltage. The SDR base station further includes a digital signal processor to process signals received from the receiver.

One or more of the aspects above may have one or more of the following advantages. The multichannel receiver meets, for example, a P25 Common Air Interface Standard. The multichannel receiver enables implementation of multichannel P25 software-defined radio (SDR) base station with significant cost, operational and maintenance advantages compared to conventional single channel base stations. The multichannel receiver supports a wide range of frequency bands. The multichannel receiver handles differences amongst signals (e.g., power differences) of greater than 100 dB while supporting 6.25 kHz channels. The multichannel receiver requires no substantial modification if modulation or waveform characteristics change. The advantages listed are not intended to include each and every advantage. Other advantages will be apparent to one of ordinary skill in the art in light of the claims, drawings and description.

DETAILED DESCRIPTION

As used herein, the term, "channel," refers to a frequency bandwidth carrying a signal originating from a transmitter. Therefore, a multichannel receiver refers to a receiver, which receives multiple signals. In some examples, multiple signals may come from multiple transmitters. In some examples, the multiple signals may come from one transmitter generating multiple signals.

As used herein a "signal" received at a receiver refers to a signal generated from a transmitter over a channel.

As used herein, a "received waveform" refers to a waveform received at a receiver and may include multiple channels (i.e., the received waveform includes multiple signals).

Previously, a receiver received a signal from a single channel. However, in multichannel environments, a use of multiple receivers (each receiver dedicated to a channel) is expensive. Therefore, it is desirable to have a single receiver capable of receiving multiple channels.

Figure 1:
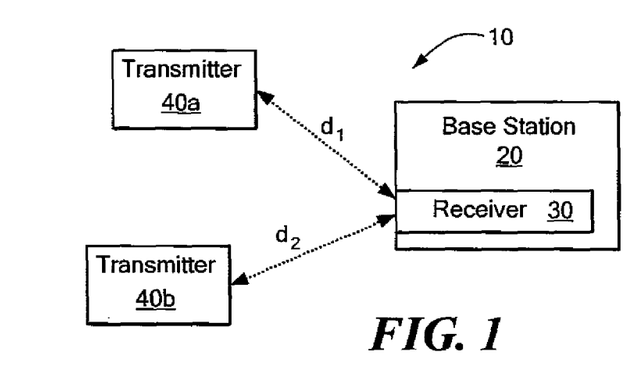
FIG. 1 is a diagram of a communications system.

Referring to FIG. 1, a communications system 10 includes a base station 20 (e.g., a software defined radio (SDR) base station) with a multichannel receiver 30, and mobile transmitters (e.g., a transmitter 40a and a transmitter 40b). In one example, the transmitters 40a, 40b are within mobile radios (not shown).

The multichannel receiver 30 in the communications system 10 may be susceptible to a near-far problem. For example, the transmitter 40a is transmitting on frequency, $f_1$, at a distance, $d_1$, which is relatively near to the base station 20 compared to the transmitter 40b transmitting on frequency, $f_2$, at a distance, $d_2$, from the base station, which is relatively far from the base station. When both transmitters 40a, 40b transmit simultaneously even on separate carrier frequencies but in the same band and at equal powers to the base station 20, the receiver 30 receives significantly greater power from the transmitter 40a than from the transmitter 40b because transmitter 40a is closer to the base station. The transmitter 40a saturates the receiver 30 and overpowers a power signal emitted from the transmitter 40b.

Previous attempts to solve the near-far problem involved adjusting the signals (e.g., the power of the signals) at the transmitters 40a, 40b. Described herein is a novel approach, which involves solving the near-far problem at the base station 20, in particular at the receiver 30.

Figure 2:
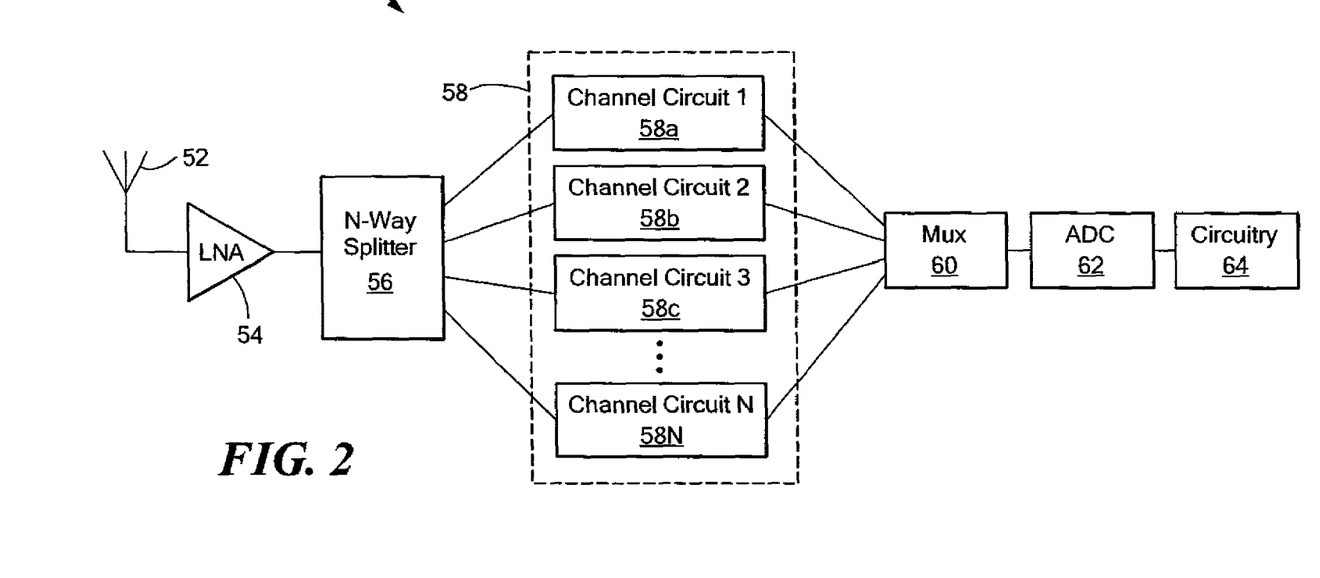
FIG. 2 is a diagram of an example of a multichannel receiver.

Referring to FIG. 2, in one example, the receiver 30 includes an antenna 52, a low-noise amplifier (LNA) 54, an N-way splitter 56, N channel circuits 58 (e.g., a first channel circuit 58a (channel 1), a second channel circuit 58b (channel 2), a third channel circuit 58c (channel 3), . . . , an Nth channel circuit 58N (Channel N)), a multiplexer 60, an analog-to-digital converter (ADC) 62 and circuitry 64.

In operation, the antenna 52 receives a radio frequency (RF) waveform. The received RF waveform passes to the LNA 54 which amplifies the power of the received RF waveform. The N-way splitter 56 provides the amplified RF waveform to the N channel circuits 58. In one example, N ranges from about eight to twelve.

As will be described in further detail below, adjustments of the received signals (e.g., power equalization) is achieved through the use of an RF filter implementation at the receiver which selects signals from channels separately using channel circuits and the adjustment of signal fluctuations with the signals (e.g., performs power equalization) by attenuating strong signals or amplifying weaker signals across the frequency spectrum through gain control feedback circuits in the channel circuits. For example, the N channel circuits 58 select signals from the RF waveform by using filters. The N channel circuits 58 adjust the selected signals using feedback circuits so that the selected signals are within a certain tolerance.

The adjusted signals are combined in the multiplexer 60 and sent to the ADC 62 for processing by the circuitry 64 (e.g., a digital signal processor (DSP) (not shown)). In one example, the circuitry 64 includes error correction and filtering prior to the DSP. In one example, the DSP is used for demodulation.

The receiver 30 depends upon the characteristics of the ADC 62 to ensure that signals sent to the ADC fit within the ADC's operating range. As will be further described, the N channel circuits 58 provide a mechanism to ensure that the receiver 30 operates within the operating range of the ADC 62.

Figure 3:
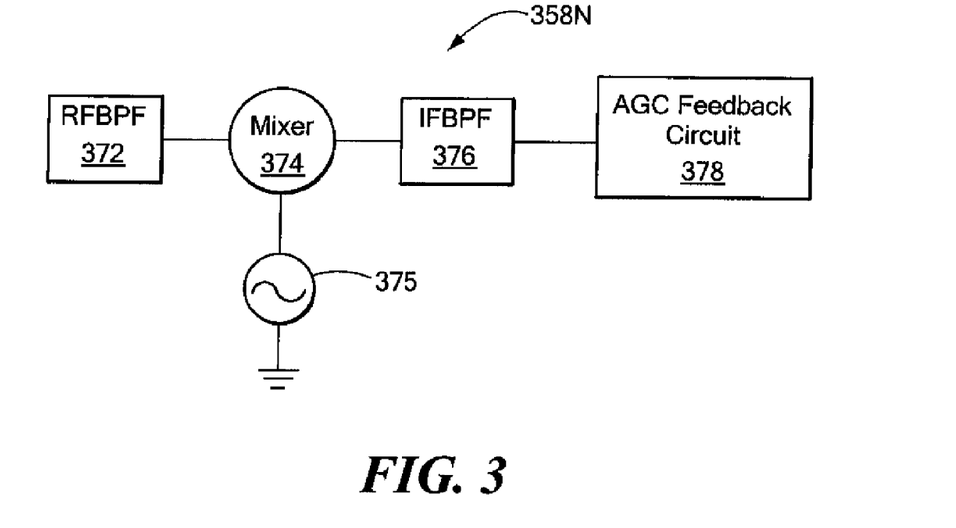
FIG. 3 is a diagram of an example of a channel circuit.

Referring to FIG. 3, an example of a channel circuit (e.g., a channel circuit 358) of the N channel circuits 58 includes a band pass (BP) filter 372, a mixer 374 receiving a local oscillator (LO) signal from a LO 375, the IF BP filter 376 and an automatic gain control (GC) feedback circuit 378. Even though one channel circuit is described herein all the other channels circuits in the N channel circuits include the same components except that the BP filter in each channel circuit is different (i.e., each BP filter has a different center frequency) in order to select a different channel (i.e., a different portion of the received waveform).

The RF BP filter 372 filters a portion of the received RF waveform to select a band of frequencies (i.e., a channel) to pass, while attenuating signals outside the same frequency band. In one example, the RF BP filter 372 is a narrowband filter isolating frequencies that are no greater than about ±0.03125% from a center frequency. In one example, the BP filter 372 allows for 12.5 kHz and 6.25 kHz channels to be selected from the received RF waveform.

The RF BP filter 372 may be a quartz crystal filter, a ceramic filter, a surface acoustic wave (SAW) filter, a miniaturized quartz nanoresonator filter, a micro-electro-mechanical systems (MEMS) resonator filter, a thin-film resonator filter (also known as bulk acoustic wave (BAW) or thickness sheer mode (TSM) filter) and so forth. For example, for frequency bands from 40 MHz to 850 MHz, the quartz crystal filter may be used to filter for specified extremely narrow bandwidths ranging from about ±0.03125% (i.e., 12.5 kHz/40 MHz×100) from a center frequency up to as narrow as about ±0.00625% (i.e., 12.5 kHz/200 MHz×100) from a center frequency for low frequency ranges (40 MHz-200 MHz). For higher frequencies exceeding 200-300 MHz, for example, the SAW resonator filter may be used.

In a further example, to achieve ±0.001% from a center frequency for the full frequency range, a dynamic filter using miniaturized quartz nanoresonators with ultra-high Q (>10, 000), low insertion loss, and frequency accuracy on the order of parts per billion (ppb) may be used. In another example, the MEMs resonator filter may be used to achieve ±0.001% from a center frequency. In a still further example, the thin-film resonator filter may be used to achieve ±0.001% from a center frequency.

The mixer 374 modulates the RF signal to convert the frequency of the received signal by mixing the RF signal with the LO signal from the LO 375. In some examples, the LO frequency ranges from about 29.3 MHz to 959 MHz. In one example, the RF signal is up-converted. In another example, the frequency is down-converted. In one example, the frequencies in the N channel circuits 58 are converted to the same or substantially the same frequency. In one example, the IF BP Filter 376 set for 12.5 kHz channel spacing may be used at a 10.7 MHz, 45 MHz, 70 MHz, or 109 MHz frequency.

Figure 4:
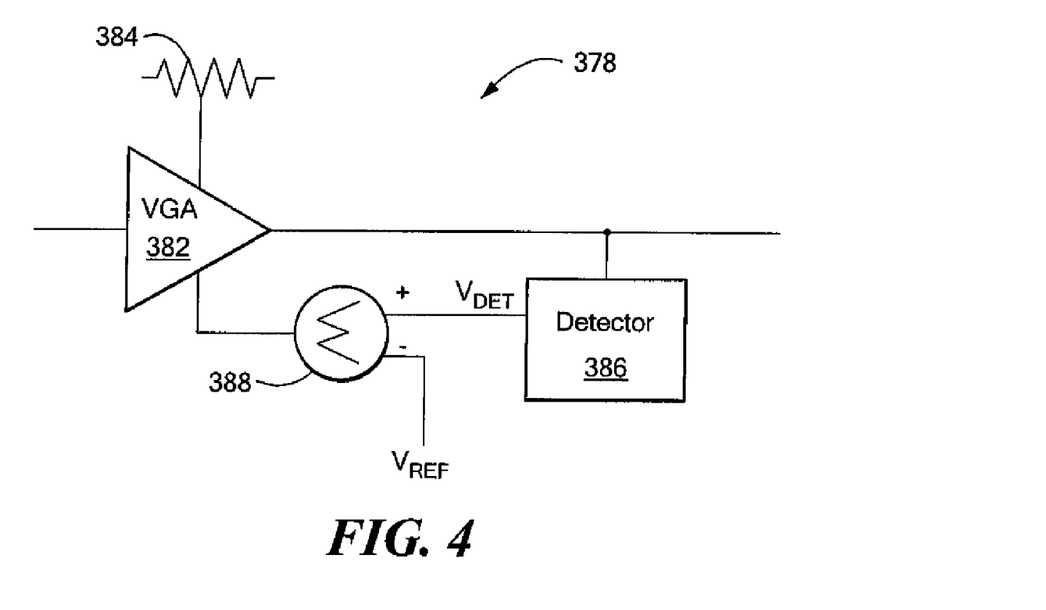
FIG. 4 is a diagram of an example of an automatic gain control (GC) feedback circuit.

Referring to FIG. 4, in one example, the GC feedback circuit 378 includes a variable gain amplifier (VGA) 382 with an associated attenuator 384, a level detector 386 (e.g., an RMS detector, a peak detector, a square detector and so forth) and a summer 388. The GC feedback circuit 378 adjusts a peak amplitude of the signal received from the IF BP filter 376, which may vary over a wide dynamic range with respect to peak amplitudes from other signals in the other N channel circuits 58. In some example, the peak amplitudes between the signals in the N channel circuits may vary with respect to each other over a range up to and exceeding 100 dB. The GC feedback circuit 378 adjusts the signal levels in the N channel circuits across the frequency spectrum so that the signal peak amplitudes are within the operating range of the ADC 62. The GC feedback circuit 378 controls the RF signal fluctuations caused by the near-far problem by adjusting the gain of the VGA 382.

The level detector 386 determines a signal's amplitude from an output signal from the VGA 382. The detector 386 generates a corresponding DC voltage output, $V_{det}$. The summer 388 compares $V_{det}$ with a reference set point, $V_{ref}$. $V_{ref}$ is a negative reference voltage provided by the ADC 62. An output of the summer 386 is provided to the VGA 382 to attenuate (e.g., using the attenuator 384) or to amplify the signal. If $V_{ref}$ and $V_{det}$ are not the same, for example, the gain of the VGA 382 would increment or decrement accordingly. In one example, the GC feedback circuit 376 is an AD8367 chip manufactured by Analog Devices, Inc. of Norwood, Mass. In one example, a response time of the GC feedback circuit 376 is from about 1 to about 10 ms.

FIGS. 5 and 6A-6C show an exemplary process 500 for processing signals at the receiver. Process 500 receives a waveform (502). For example, an RF waveform 610 is received at the antenna 52 (FIG. 2). Process 500 amplifies the received waveform (508). For example, the LNA 54 (FIG. 2) amplifies the waveform 610.

Figure 5:
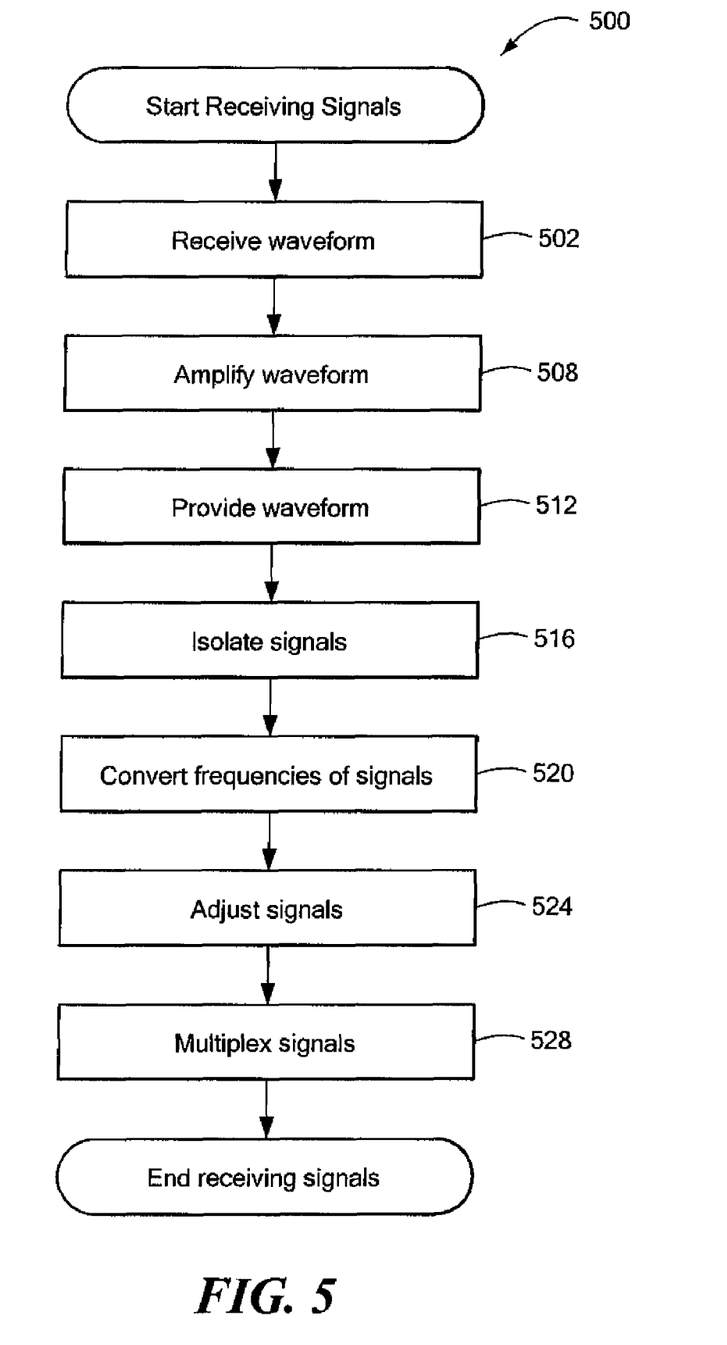
FIG. 5 is a flowchart of a process to receive multiple signals.
Figure 6A:
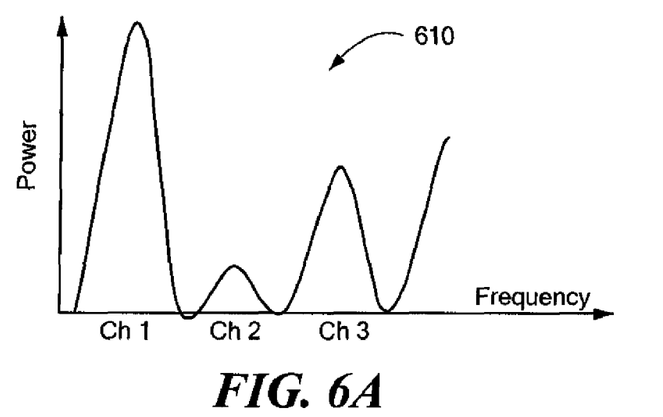
FIGS. 6A to 6C are graphs of a waveform.
Figure 6B:
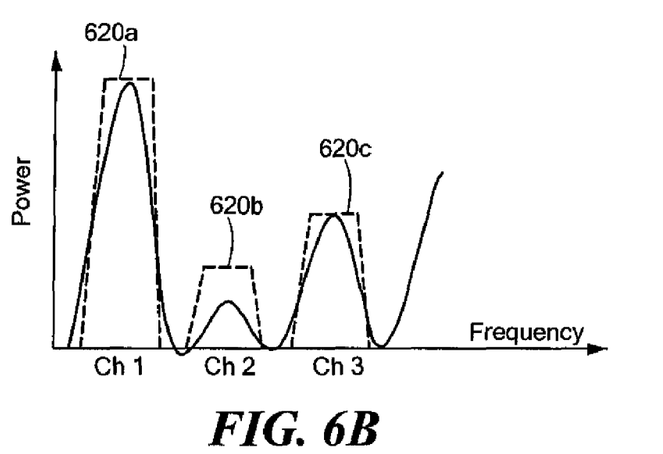
Figure 6C:
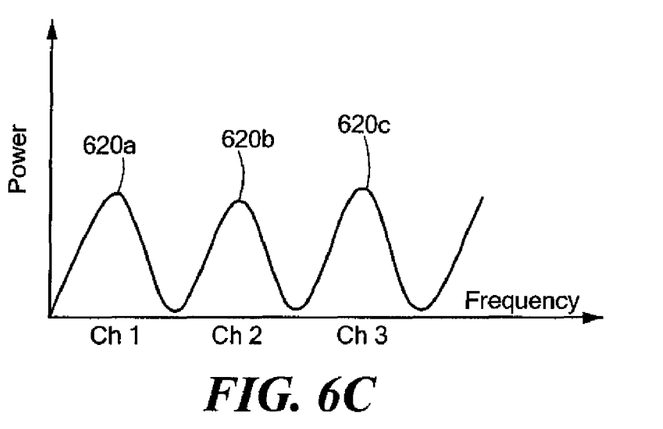

Process 500 provides the waveform to the N channel circuits (512). For example, each of the N channel circuits 58 (FIG. 2) receives the RF waveform 610.

Process 500 isolates the signals in the N channel circuits 58 (516). For example, the N channel circuits isolate a portions of the RF waveform using the BP filter in the corresponding channel (e.g., BP filter 372 in FIG. 3). In one example in FIG. 6B, a first channel circuit would isolate signal 620a in channel 1, a second channel circuit would isolate a signal 620b in channel 2 and a third channel circuit would isolate a signal 620c in channel 3.

Process 500 converts frequencies of the filtered signals (520). For example, the filtered signals (e.g., the signals 620a-620c) are down-converted by a corresponding mixer (e.g., the mixer 374 in FIG. 3). In another example, the filtered signals are up-converted by a corresponding mixer. In one example, a single mixer converts the signals for all the channels. In one example, the filtered signals are converted to the same or substantially the same frequency.

Process 500 adjusts the converted signals (524). For example, the converted signals provided by the N channel circuits 58 are adjusted by a corresponding GC feedback circuit (e.g., the GC feedback circuit 378) in the N channel circuit, which adjusts the signals 620a-620c with respect to the reference voltage (set-point). In one example, in FIG. 6C, the signals 620a-620c are adjusted to have the same peak power amplitude. In other examples, the peak amplitudes of the signals may be within a predetermined threshold. Process 500 multiplexes the signals (528). For example, the signals 620a-620c are passed through a multiplexer 60 (FIG. 2).

Figure 7A:
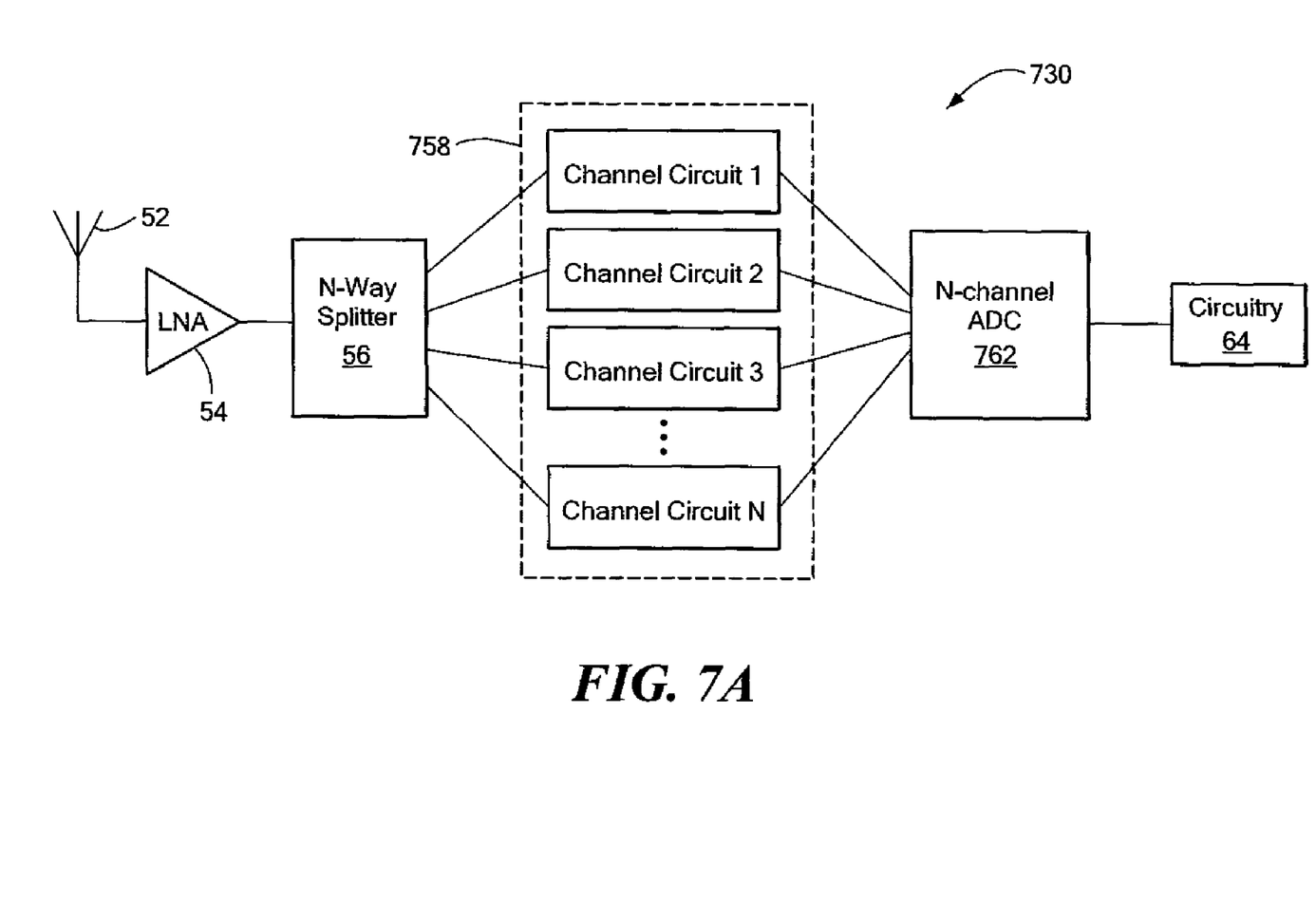
FIG. 7A is a diagram of another example of the multichannel receiver.
Figure 7B:
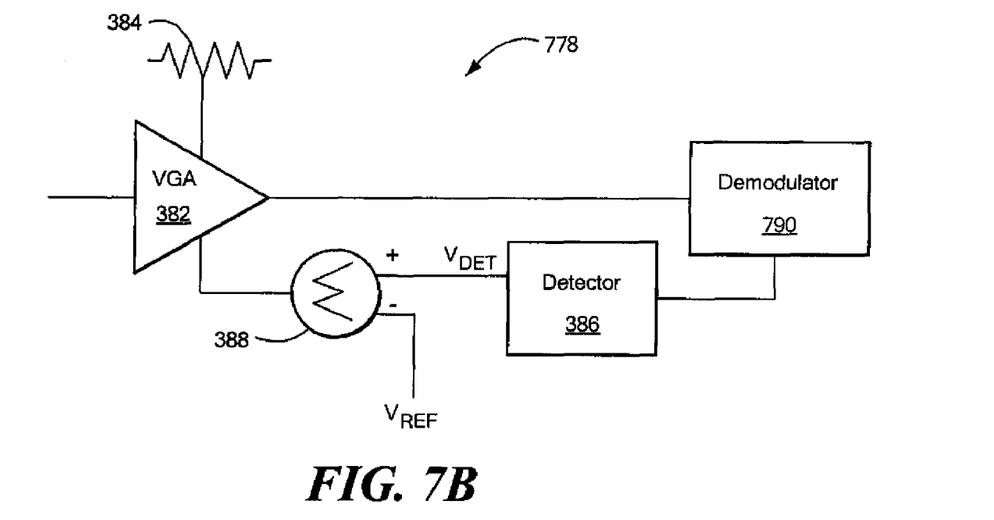
FIG. 7B is a diagram of another example of the GC feedback circuit.

Referring to FIGS. 7A and 7B, in other examples of a receiver, a receiver 730 includes most of the same components as the receiver 30 except the receiver 730 includes an N-channel ADC 762 instead of the multiplexer 60 and the ADC 62. Also, the GC feedback circuit 78 is replaced by a GC feedback circuit 778 which includes an additional component, a demodulator 790.

In the receiver 30, demodulation takes place digitally after the ADC 62; however, in the receiver 730 demodulation occurs within the N channel circuits 758. For example, the IF input is converted down to a baseband frequency, at which point it is digitized using the N-channel ADC 762. In one example, the N-channel ADC 762 may be an AD7908, AD7918 or AD7928 chip manufactured by Analog Devices, Inc. of Norwood, Mass. In one example, the AGC feedback circuit 778 is manufactured on a single chip, which allows the N-channel ADC 762 to include fewer components compared to the ADC 62. For example, the ADC 762 may be required to be 10 kilo symbols per second (ksps) compared to a single high-speed ADC 62 that may require 10 mega symbols per second (Msps).

In one example, the receiver 30 operates on any of the frequency ranges (e.g., Very High Frequency (VHF) (about equal to 135-174 MHz), Ultra-high Frequency (UHF) (about equal to 440-520 MHz), 700/800 MHz ranges and so forth). In other examples, the N channel circuits 58 are used with frequency range of 40 MHz to 850 MHz. In one example, channel spacing (bandwidth (BW)) is 25 kHz. In another example, the channel spacing is 12.5 kHz. In a further example, the channel spacing is 6.25 kHz. In one example, at 25 kHz BW, the BP filter 372 may be anywhere from a 0.025% to a 0.003% BW from the center frequency. In another example, the BP filter 372 may be 0.001% BW from the center frequency for a 12.5 kHz BW and a 6.25 kHz BW.

Figure 8:
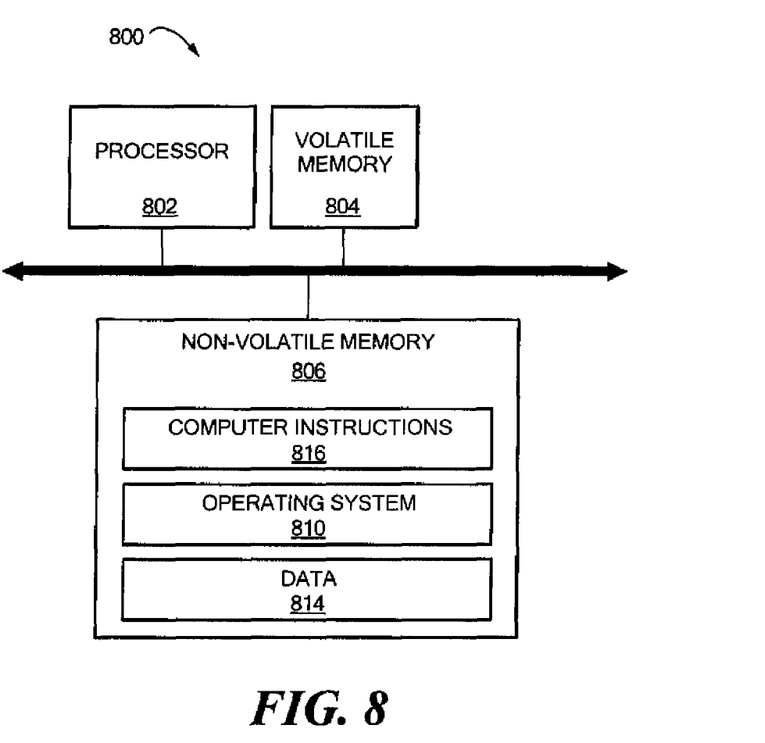
FIG. 8 is a block diagram of a computer system on which the process of FIG. 5 may be implemented.

FIG. 8 shows a computer 800, which may be used to execute all or part of process 500. Computer 800 includes a processor 802, a volatile memory 804 and a non-volatile memory 806 (e.g., hard disk). Non-volatile memory 806 includes an operating system 810, data 814, and computer instructions 816 which are executed out of volatile memory 804 to perform process 500 or portions of process 500.

Process 500 is not limited to use with the hardware and software of FIG. 8; it may find applicability in any computing or processing environment and with any type of machine or set of machines that is capable of running a computer program. Process 500 may be implemented in hardware, software, or a combination of the two. Process 500 may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform process 500 and to generate output information.

The system may be implemented, at least in part, via a computer program product, (i.e., a computer program tangibly embodied in an information carrier (e.g., in a machine-readable storage device or in a propagated signal)), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform process 500. Process 500 may also be implemented as a machine-readable storage medium, configured with a computer program, where upon execution, instructions in the computer program cause the computer to operate in accordance with process 500.

The processes described herein are not limited to the specific embodiments described herein. For example, the processes are not limited to the specific processing order of FIG. 5. Rather, any of the blocks of FIG. 5 may be re-ordered, combined or removed, performed in parallel or in serial, as necessary, to achieve the results set forth above.

The system described herein is not limited to use with the hardware and software described above. The system may be implemented in digital electronic circuitry, or in computer hardware, firmware, software, or in combinations thereof.

Method steps associated with implementing the system may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer include a processor for executing instructions and one or more memory devices for storing instructions and data.

Elements of different embodiments described herein may be combined to form other embodiments not specifically set forth above. Other embodiments not specifically described herein are also within the scope of the following claims.

What is claimed is:

1. A receiver for use in a software defined radio (SDR) multichannel receiver configured to receive signals from multiple transmitters, the receiver comprising:
    a first channel circuit of N channel circuits, comprising:
        a band pass (BP) filter that isolates a first frequency bandwidth carrying a signal originating from a first transmitter; and
        a gain control (GC) feedback circuit configured to adjust a signal provided by the BP filter with respect to a reference voltage; and
    a second channel circuit of the N channel circuits comprising a second GC feedback circuit configured to adjust a signal provided by a second BP filter with respect to the reference voltage, wherein the second BP filter isolates a second frequency bandwidth different from the first frequency bandwidth carrying a second signal originating from a second transmitter;
    an N-way splitter coupled to the BP filter and the second BP filter, the N-way splitter providing an input signal to both of the BP filter and the second BP filter; and
    a multiplexer connected to the GC feedback circuit and the second GC feedback circuit, the multiplexer combining an output from each of the GC feedback circuit and the second GC feedback circuit to provide an output signal.

2. The receiver of claim 1, further comprising:
    a low-noise amplifier (LNA) coupled to the N-way splitter.

3. The receiver of claim 2, further comprising an analog-to-digital converter coupled to the multiplexer.

4. The receiver of claim 1 wherein the GC feedback circuit comprises:
    a variable gain amplifier (VGA);
    a detector coupled to the VGA; and
    a summer coupled to the detector and the VGA.

5. The receiver of claim 4 wherein the GC feedback circuit comprises a demodulator coupled to the VGA.

6. The receiver of claim 5, further comprising an N-channel analog-to-digital converter (ADC) coupled to the demodulator.

7. The receiver of claim 1 wherein the first channel comprises:
    a mixer coupled to the BP filter; and
    an intermediate frequency (IF) BP filter coupled to the mixer and the GC feedback circuit.

8. The receiver of claim 1 wherein the BP filter comprises a BP filter isolating frequencies that are no greater than about ±0.03125% from a center frequency.

9. The receiver of claim 8 wherein the BP filter comprises a miniaturized quartz nanoresonator filter.

10. The receiver of claim 8 wherein the BP filter comprises at least one of a quartz crystal filter, a ceramic filter, a surface acoustic wave (SAW) filter, a micro-electro-mechanical systems (MEMS) resonator filter or a thin-film resonator filter.

* * * * *